3,097,172
RADIATION SENSITIVE GLASS
Robert Joseph Ginther, 5507 Myrtle Ave.,
Temple Hills, Md.
No Drawing. Filed Jan. 31, 1961, Ser. No. 86,255
3 Claims. (Cl. 252—301.4)
(Granted under Title 35, U.S. Code (1952), sec. 266)

This invention described herein may be manufactured and used by or for the Government of the United States of America for governmental purposes without the payment of any royalties thereon or therefor.

The present invention relates to glass having the property of scintillating in response to nuclear radiation such as gamma rays and neutrons and useful as the radiation sensitive element or detector in scintillation counters.

Radiation detectors heretofore employed in scintillation counters have usually been either a crystal of organic or inorganic material or an organic plastic element. While an efficient conversion of the incident radiation to scintillations may be had with those previous detectors, the crystals employed have to be grown by time-consuming and expensive methods. Such crystals have been prepared, moreover, only in a very limited variety of shapes and sizes. Although the organic plastic type detector does not have the limitation of the crystal type as to shapes and sizes, the special processing of them has rendered them expensive.

It is an object of the present invention to provide new material for making radiation detectors for scintillation counters at lower cost than the prior art crystal and plastic type detectors. It is also an object to provide new glass which is capable of scintillating in response to gamma rays and to neutrons. It is a further object to provide glass of this kind which is easy to melt and cast.

I have found that the above and other objects of the invention can be accomplished by incorporating trivalent cerium in certain lithium-aluminosilicate glasses which are hereinafter more fully described. The trivalent cerium sensitizes the glasses to scintillate in response to gamma rays and to neutrons. The lithium in the glasses contains the isotope lithium 6 which is a neutron acceptor and through it the glasses are caused to scintillate in response to neutrons.

The new radiation sensitive glasses of my invention are colorless transparent products which contain trivalent cerium as cerous oxide ($Ce_2O_3$), lithium oxide, alumina and silica. Glass compositions in accordance with the invention and relative proportions of the components of the glasses are as follows:

| | Mole percent |
|---|---|
| $Li_2O$ | 11.5–30.5 |
| $Al_2O_3$ | 2–15 |
| $Ce_2O_3$ | 0.3–2 |
| $SiO_2$ | 62–80 |

The efficiency of the glasses of the invention as radiation detectors for gamma rays can be determined by measuring their scintillation pulse heights against those obtained with the use of the thallium activated sodium iodide crystal of Hofstadter as the standard. This efficiency will depend upon the particular composition of the glasses and range from about 4 to 14% of the pulse height of the Hofstadter crystal. Substitution of boron or phosphorus for silica in the glasses will produce quenching of the scintillation pulse. Replacement of lithium with other alkali ions in the glasses is not desirable and cannot be had without loss of neutron response and reduction of gamma ray sensitivity. The use of potassium will yield a poor glass product in which cerium is not easily maintained in the trivalent state. Substitution of sodium for lithium in the glass will reduce the gamma excited pulse height by about 20%.

Alumina is necessary in the formulation of the new glasses in order to render the glass matrix a suitable solvent for the cerium in the desired concentrations to give practical pulse heights, for which amounts of alumina in the glasses of from about 2 to 15 mole percent will induce dissolved concentrations of from about 0.3 to 2 mole percent of cerous oxide in the glasses.

The new glass compositions of my invention may be prepared by dry blending the starting materials, which may be oxides, carbonates or oxalates, in pure form and melting the blended glass batch under a reducing atmosphere at a temperature of about 1500° C. Preferred starting materials for the new glasses are lithium carbonate, aluminum oxide or hydroxide, cerous oxalate, and sand or precipitated silicic acid. For greater sensitivity of the glasses to neutrons, lithium carbonates are used which are enriched in the isotope lithium 6.

A reducing atmosphere in the melting of the glass components is necessary in order to maintain the cerium in the trivalent state. It is well known in the art that tetravalent cerium does not serve as an activator of luminescence. A convenient method for obtaining a suitable reducing atmosphere is to conduct the melting of the starting materials in a platinum crucible which rests in an alumina crucible of about the same size, the assembly being placed in a bed of carbon contained in a larger covered alumina crucible. This arrangement of the platinum crucible in the alumina crucible protects the platinum crucible from contact with the carbon. The glass melt may be allowed to cool in the platinum crucible or poured into suitable molds to produce glass castings.

Casting of the glass is made at temperatures close to the melting temperature of the glass which is about 1500° C. and in a non-oxidizing atmosphere. The glasses so produced are clear and colorless. If the glasses are melted or cast in an oxidizing atmosphere they will be colored yellow to brown by the presence of tetravalent cerium. Even though all of the cerium in the glass may not be oxidized to the tetravalent state, the blue luminescence of the trivalent cerium will be absorbed by the yellow or brown glass and very weak pulses or none at all will be obtained upon excitation with gamma rays or neutrons.

For radiation sensitive glasses in accordance with the invention which will provide a pulse height in the preferred range of from about 11 to 14% that of the thallium activated sodium iodide crystal, compositions are used which contain the components in a narrower range of relative proportions as follows:

| | Mole percent |
|---|---|
| $Li_2O$ | 17–24.5 |
| $Al_2O_3$ | 2.8–10.7 |
| $Ce_2O_3$ | 0.6–2 |
| $SiO_2$ | 68–77 |

A preferred glass of the invention which will provide a pulse height of 14% that of the NaI(Tl) crystal on exposure to gamma radiation has the composition:

| | Mole percent |
|---|---|
| $Li_2O$ | 21.9 |
| $Al_2O_3$ | 2.8 |
| $Ce_2O_3$ | 1.2 |
| $SiO_2$ | 74.1 | and may be prepared in the following manner which is illustrative of the preparation of the glasses of the invention:

*Example*

A dry blend of 3.24 grams lithium carbonate, 0.572 gram alumina, 1.66 grams cerous oxalate (48.3% $Ce_2O_3$ by weight) and 8.92 grams $SiO_2$ is prepared by tumbling the mixture in a glass bottle on rollers for a period of about twenty minutes. The dry blend is placed in a platinum crucible of 50 ml. capacity and melted in a reducing atmosphere at 1500° C. The heating can be accomplished in an electric furnace having silicon carbide heating elements. The charge is held at 1500° C. for a period of preferably from four to sixteen hours to insure substantially complete melting and mixing, and reduction of any cerium which may become oxidized to the tetravalent state during the early stages of the heating. The reducing atmosphere for the melting of the glass batch is obtained, as described above, by placing the platinum crucible containing the glass batch in an alumina crucible of about the same size, lodging the alumina crucible in a bed of graphite in a covered larger cylindrical alumina crucible which in dimension is about 2¼″ in diameter and about 4¼″ in height. The cylindrical crucible should be tightly covered, for which platinum foil suitably can serve as the cover. The glass obtained is colorless and transparent.

After the melting operation has been completed, the crucible assembly is removed from the furnace and allowed to cool to room temperature. Experience has shown that glass quantities of the above size do not crack under such cooling conditions. The glass may be removed from the cooled platinum crucible either by spreading the walls of the crucible away from the glass or by mildly heating the platinum crucible with a torch and lightly tapping it with a mallet to dislodge the glass. The glass may be annealed to remove strain by heating it at a temperature of about 550° C., following known glass annealing practice.

Since the invention may be variously embodied without departing from the spirit or scope thereof, it is intended that specific embodiments thereof appearing in the above description shall be taken by way of illustration rather than in limitation, except as may be required by the appended claims.

What is claimed is:

1. A colorless and transparent glass containing trivalent cerium and scintillating in response to gamma rays and neutrons, said glass consisting essentially of from about 11.5 to 30.5 mole percent lithium oxide, from about 2 to 15 mole percent alumina, from about 0.3 to 2 mole percent cerous oxide and from about 62 to 80 mole percent silica.

2. A colorless and transparent glass containing trivalent cerium and scintillating in response to gamma rays and neutrons, said glass consisting essentially of from about 17 to 24.5 mole percent lithium oxide, from about 2.8 to 10.7 mole percent alumina, from about 0.6 to 2 mole percent cerous oxide and from about 68 to 77 mole percent silica.

3. A colorless and transparent glass containing trivalent cerium and scintillating in response to gamma rays and neutrons, said glass consisting essentially of about 21.9 mole percent lithium oxide, about 2.8 mole percent alumina, about 1.2 mole percent cerous oxide and about 74.1 mole percent silica.

References Cited in the file of this patent

UNITED STATES PATENTS

| | | |
|---|---|---|
| 1,703,391 | Eckert | Feb. 26, 1929 |
| 1,726,635 | Taylor | Sept. 3, 1929 |
| 2,219,332 | Pirani | Oct. 29, 1940 |